United States Patent [19]

Sierakowski et al.

[11] Patent Number: 5,603,750

[45] Date of Patent: Feb. 18, 1997

[54] FLUOROCARBON FLUIDS AS GAS CARRIERS TO AID IN PRECIOUS AND BASE METAL HEAP LEACHING OPERATIONS

[75] Inventors: Michael J. Sierakowski, Grant Township, Washington County; Jennifer E. Waddell, Burnsville, both of Minn.

[73] Assignee: Minnesota Mining and Manufacturing Company, St. Paul, Minn.

[21] Appl. No.: 514,808

[22] Filed: Aug. 14, 1995

[51] Int. Cl.$^6$ .................................................... C22B 11/00
[52] U.S. Cl. .............................. 75/743; 75/744; 423/27; 423/29
[58] Field of Search .................... 75/718, 719, 729, 75/735, 737, 743, 744; 423/27, 29, 40, 41

[56] References Cited

U.S. PATENT DOCUMENTS

| | | | |
|---|---|---|---|
| 3,846,124 | 11/1974 | Guay | 75/112 |
| 4,038,362 | 7/1977 | Guay | 423/40 |
| 4,102,916 | 7/1978 | Falk | 260/501.12 |
| 4,169,583 | 10/1979 | Cramer | 266/122 |
| 4,171,248 | 10/1979 | Carlin | 204/89 |
| 4,171,282 | 10/1979 | Mueller | 252/356 |
| 4,177,246 | 12/1979 | Stoddard et al. | 423/437 |
| 4,259,107 | 3/1981 | Guay | 75/105 |
| 4,289,532 | 9/1981 | Matson et al. | 75/105 |
| 4,632,738 | 12/1986 | Beattie et al. | 204/107 |
| 4,752,412 | 6/1988 | Van Antwerp et al. | 252/186.22 |
| 4,894,484 | 1/1990 | Lagow et al. | 568/615 |
| 4,898,611 | 2/1990 | Gross | 75/3 |
| 4,941,917 | 7/1990 | Cenegy et al. | 75/744 |
| 4,979,986 | 12/1990 | Hill et al. | 75/711 |
| 5,077,437 | 12/1991 | Robertson et al. | 568/12 |
| 5,180,398 | 1/1993 | Boardman et al. | 8/181 |
| 5,207,996 | 5/1993 | Sierakowski et al. | 423/27 |
| 5,225,054 | 7/1993 | Boateng | 204/130 |
| 5,260,040 | 11/1993 | Kenna | 423/27 |
| 5,409,736 | 4/1995 | Leiner et al. | 427/372.2 |

OTHER PUBLICATIONS

*Kirk–Othmer Encyclopedia of Chemical Technology*, vol. 11, pp. 972–992, John Wiley & Sons (3d ed. 1979).
N. C. Wall et al., "Gold Beneficiation," *Mining Magazine*, pp. 393–401 (May 1987).
A. K. Biswas & W. G. Davenport, *Extractive Metallurgy of Copper*, pp. 358–380, Pergamon (3d ed. 1994).
J. B. Hiskey, *Arizona Bureau of Geology and Mineral Technology Fieldnotes*, vol. 15, No. 4, pp. 1–5 (Winter 1985).
J. Marsden & I. House, *The Chemistry of Gold Extraction*, pp. 35, 105–06, Ellis Horwood Ltd., ISBN 0-13-131517-X (1992).
*Kirk–Othmer Encyclopedia of Chemical Technology*, vol. 21, pp. 1–6, 15, John Wiley & Sons (3d ed. 1979).
N. Abiter & A. Fletcher, "Copper Hydrometallurgy—Evolution and Milestones," *Hydrometallurgy—Fundamentals, Technology and Innovations*, pp. 549–563, Society of Mining, Metallurgy, and Exploration, Inc. (1993).
J. Marsden & I. House, *Chemistry of Gold Extraction*, pp. 111–112, 126–129, 214–221, Ellis Horwood Ltd., ISBN 0-13-131517-X (1992).

(List continued on next page.)

Primary Examiner—David A. Simmons
Assistant Examiner—Jerry Allen Lorengo
Attorney, Agent, or Firm—Gary L. Griswold; Walter N. Kirn; John A. Burtis

[57] ABSTRACT

This invention provides an improved method of leaching precious and base metal values from ore comprising contacting a metal-bearing ore or ore concentrate with an oxidizing gas solution comprising a solution of an oxidizing gas dissolved in a perfluorinated liquid, said contact being made prior to or during extraction of the precious or base metal from the ore. In another aspect, this invention provides a method of destroying cyanide from a cyanide-containing solution comprising contacting said solution with a solution of an oxidizing gas dissolved in a perfluorinated liquid.

15 Claims, 2 Drawing Sheets

OTHER PUBLICATIONS

D. Bhattacharyya et al., "Oxidation of Hazardous Organics in a Two–Phase Fluorocarbon–Water System", *Hazardous Waste & Hazardous Materials*, vol. 3, No. 4, pp. 405–428 (Winter 1986).

J. C. Yannopoulos, *The Extractive Metallurgy of Gold*, pp. 115–117, 127, Van Nostrand Reinhold, ISBN 0–442–31797–2 (1991).

Fluorinert™ Fluids, product bulletin 98–0211–8301–1 (65.05)R, issued May 1995, 3M Co., St. Paul, Minn.

FLUOROCARBON FLUIDS AS GAS CARRIERS TO AID IN PRECIOUS AND BASE METAL HEAP LEACHING OPERATIONS

FIELD OF THE INVENTION

This invention relates to a process of recovering precious metals and base metals from low-grade ores. More particularly, the present invention relates to the recovery of precious and base metal values by leach mining. In another aspect, this invention relates to a process for depleting residual cyanide concentration in barren leaching lixiviant.

BACKGROUND OF THE INVENTION

Heap leaching has long been a preferred method of recovering precious metals, such as gold and silver, and base metals, such as copper, from their corresponding ores. Sometimes also referred to as solution mining, heap leaching involves the extraction of soluble metals or salts from an ore by distributing solutions, or lixiviants, during a leaching cycle over an open ore heap piled onto an impervious base. Leach mining may also be performed by vat or agitation leach mining. Typically, dilute aqueous alkaline cyanide is used as a lixiviant for the extraction of gold and silver, and dilute aqueous sulfuric acid is used as a lixiviant for recovery of copper.

The recovery of gold and silver values from low grade ores using oxidative cyanidation is well known. See, e.g., 11 Kirk-Othmer Encyclopedia of Chemical Technology 972-92 (3d ed. 1979). Such recovery methods have been used commercially since the late 1960s. Typically, in heap leaching gold, a dilute aqueous solution of sodium cyanide and lime, having a pH of between about 10.5 and 12.5, is distributed over the top of an ore heap. Ore heaps generally average approximately 100,000 to 500,000 tons in weight and contain ore pieces ranging from less than ½ inch to greater than 6 inches in diameter and are piled over an impervious base. Gold is dissolved in an aerated cyanide solution according to the following two-step reaction mechanism:

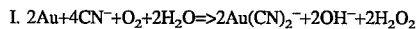

I. $2Au + 4CN^- + O_2 + 2H_2O \Rightarrow 2Au(CN)_2^- + 2OH^- + 2H_2O_2$

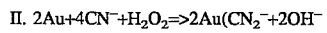

II. $2Au + 4CN^- + H_2O_2 \Rightarrow 2Au(CN_2^- + 2OH^-$

J. B. Hiskey, *Arizona Bureau of Geology and Mineral Technology Fieldnotes*, Vol. 15, No. 4, Winter 1985. The complexed gold is then recovered from the pregnant aqueous lixiviant solution, usually by adsorption onto activated carbon, and the complex is subsequently stripped and converted to elemental gold by electrowinning. The barren cyanide solution is then recirculated to the heap for further leaching, with some replenishment of cyanide if necessary. Leaching of silver is performed analogously, forming the $Ag(CN)_2^-$ complex from which elemental silver is usually recovered using zinc dust metal replacement.

Currently, most copper produced by hydrometallurical processing is recovered from the leaching of oxide or secondary sulfide copper ores in heap and dump leach operations. Leaching typically is carried out by sprinkling a dilute solution of sulfuric acid over the top of heaps of broken ore, allowing the acid to trickle through the heaps and dissolving the copper mineralization over a period of several weeks or months. Such hydrometallurgical recovery of copper by leaching primary sulfide deposits is considered difficult and uneconomical due to the refractory nature of the copper mineralization and does not lend itself to sulfuric acid leaching unless oxidative conditions are present during the leach cycle. Recovery of copper values from primary sulfide ore, such as chalcopyrite, typically is limited to conventional pyrometallurgical ore processing by mining, crushing, and ore flotation followed by smelting and electrolytic refining of the copper.

According to Hiskey, supra, compared to conventional milling (i.e., crushing, grinding, and agitation leaching), recovery of gold and silver by heap leaching offers several advantages, among them lower capital and operating costs, shorter start-up times, and fewer environmental risks. Such advantages are, however, offset somewhat by lower metal extractions. Typically, only 60 to 80 percent of available precious metal values can be recovered using state-of-the-art heap leaching techniques. Because many larger ore pieces in heaps are poorly wet, they are poorly extracted. At the opposite extreme, when the larger ore pieces are crushed into smaller pieces to improve extraction, fines are produced that can plug the heap, especially at its bottom, reducing the rate of leachate flow through the heap.

Beneficiation techniques are sometimes employed to increase metal recoveries from ores over those obtained by conventional methods. Beneficiation techniques encompass many and varied processes all with the design to concentrate ore for further processing and extraction. Comminution and agglomeration are the most widely used beneficiation technologies for the recovery of gold and silver. See N. C. Wall, et al. *Gold Beneficiation, Mining Magazine* (May 1987) (detailing recent developments in beneficiation technology in the extraction of gold). See also A. K. Biswas & W. G. Davenport, *Extractive Metallurgy of Copper*, Pergamon (3d ed. 1994) (detailing concentration techniques for the extraction of copper).

Oxidative treatments are also sometimes used to increase metal recovery from ores that, because of their particular characteristics, exhibit poor recovery by conventional leaching processes. These so-termed refractory ores may, for example, contain significant concentrations of clays that impede uniform lixiviant percolation or may contain other lixiviant-consuming materials. Oxidizing agents may be used to alter sulfide and carbonaceous gangue mineralizations in such ores, thereby opening leaching channels and/or converting insoluble forms of metals, such as sulfides, into forms more readily soluble in the lixiviants, e.g. oxides and chlorides. Oxidizing gases, including oxygen, ozone, chlorine, and chlorine dioxide, have been used as oxidizing agents, but because of their relatively high vapor pressure, such gaseous oxidizing agents require expensive sealed and pressurized units or volume-limiting, batch-type vessels.

To provide handling convenience and cost-effectiveness, oxidizing reagents are more often applied from aqueous solution. Widely used aqueous oxidizing solutions include hypochlorous acid (generated from sodium hypochlorite), hydrogen peroxide, and nitric acid. These aqueous solutions are, however, less reactive than their gaseous counterparts, often requiring elevated temperatures and significant agitation to complete the ore oxidation process in a reasonably timely manner. Use at elevated temperatures can also lead to oxidizer depletion from hydrolysis that prevents delivery of the oxidizing agent to ore particles in its most reactive and efficient form. As an additional drawback to use of aqueous oxidizing solutions, large volumes of corrosive and pollutant aqueous effluent are created downstream from the leaching process that must be processed and treated, adding additional costs to the overall metal recovery process.

Attempts been made in recent years to provide oxidative treatments comprising saturated aqueous solutions of oxidizing gases. U.S. Pat. Nos. 3,846,124, 4,038,362, and 4,259,107, all to Guay, explore the use of chlorine gas to increase gold recovery from sedimentary gold-bearing ores by slurrying the ore with water and saturating the slurry with chlorine gas prior to cyanidation. In a similar vein, U.S. Pat. No. 4,979,986 (Hill et al.) discloses a method for oxidizing gold-bearing ore by contacting an aqueous slurry of ore with gaseous chlorine or hypochlorite salt and subjecting the slurry to high shear using an impeller. Additionally, U.S. Pat. No. 4,289,532 to Matson et al. describes a process for recovery of gold values from carbonaceous ores by forming an aqueous alkaline ore slurry, subjecting the slurry to oxidation with an oxygen-containing gas, intimately contacting the oxygenated slurry with a source of hypochlorite ions, and subsequently contacting the slurry with a cyanide complexing agent.

Several experimental copper leach-oxidative recovery techniques have been proposed in recent years including: (a) ferric and cupric chloride leaching followed by solvent extraction and electrowinning of copper powder; (b) sulfuric acid-oxygen pressure leaching followed by direct electrowinning of product copper; (c) ammonia-oxygen pressure agitation leaching followed by copper reduction and solvent extraction and electrowinning (Escondida and Arbiter processes); and (d) oxidative roasting of ore followed by sulfuric acid leaching. All of these processes incorporate concentration of the mineralization by crushing and froth flotation of the ore to remove undesired gangue minerals prior to leaching to ensure adequate copper recoveries with minimal reagent waste.

SUMMARY OF THE INVENTION

Briefly, in one aspect, this invention provides an improved method of leaching precious and base metal values from ore comprising contacting a metal-bearing ore or ore concentrate with an oxidizing gas solution comprising an oxidizing gas dissolved in a perfluorinated liquid, said contact being made prior to or during extraction of the precious or base metal from the ore.

In another aspect, the present invention provides a method of destroying cyanide from barren cyanide-containing lixiviant comprising contacting said lixiviant solution with a solution of an oxidizing gas dissolved in a perfluorinated liquid.

DETAILED DESCRIPTION OF THE INVENTION

Figure 1:
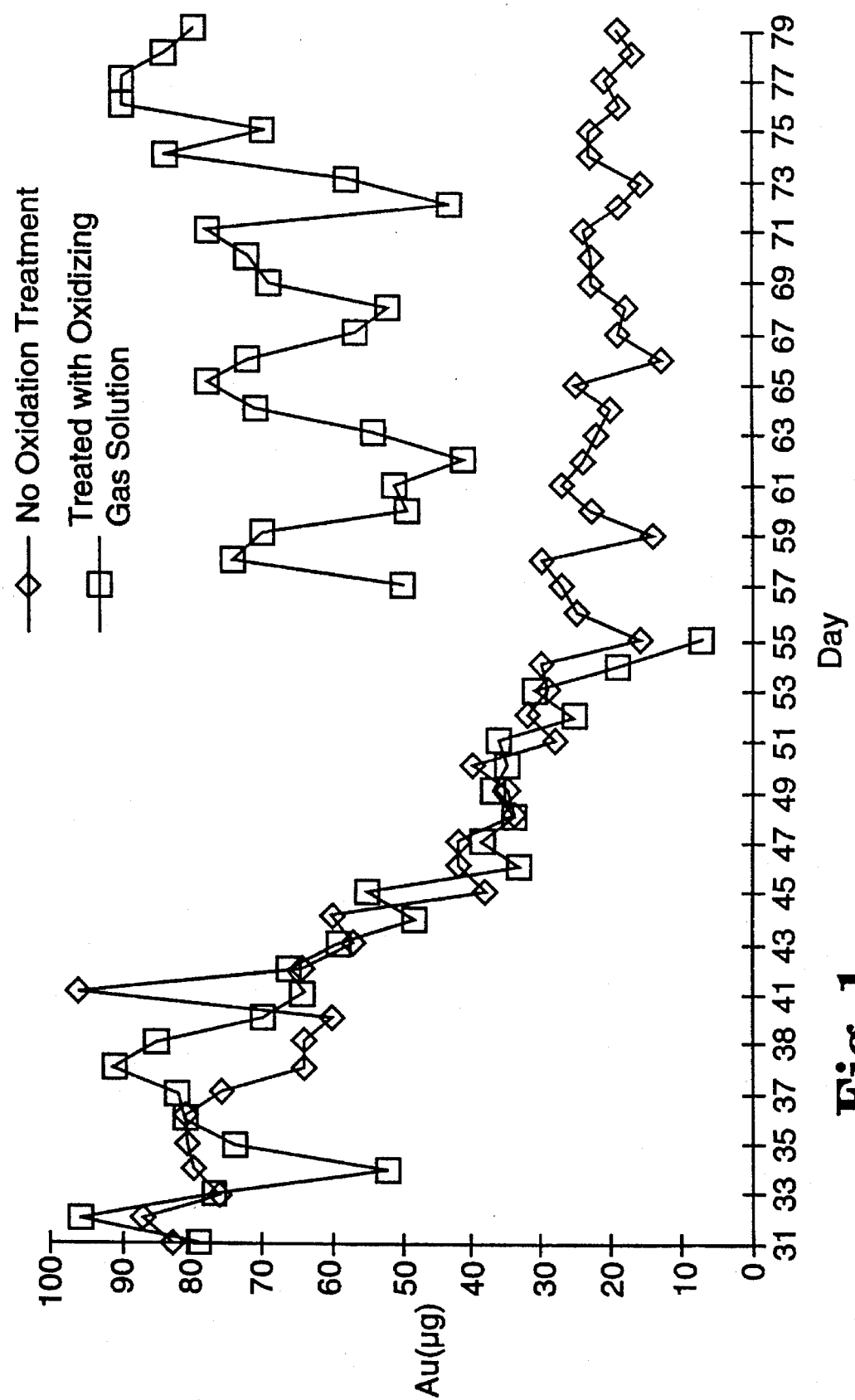
FIG. 1 is a plot of daily gold extractions recovered from two column assays of a precious metal-bearing ore, one column leached only with a cyanide-containing lixiviant and the other column interrupted during the leach cycle during days 53 and 54 for treatment with an oxidizing gas solution in accordance with this invention.

The recovery of precious metals, e.g. gold and silver, and base metals, e.g. copper, is greatly enhanced in leach mining applications by the treatment of metal-bearing ore or ore concentrate prior to or during the leach cycle with a solution of an oxidizing gas dissolved in a perfluorinated fluid (henceforth referred to as the "oxidizing gas solution"). The oxidizing gas solutions used in this invention provide a means for delivering a stable solution of an oxidizing gas in its most active, non-hydrolyzed state. These oxidizing gas solutions offer the additional advantage of providing a very low surface tension medium (generally on the order of approximately 15 dynes/cm), thereby enabling the oxidizing gas solution to efficiently contact and thoroughly penetrate ore particles.

The oxidizing gas solutions may be contacted with ore using any of the conventional processes presently used to deliver and disperse aqueous cyanide or aqueous sulfuric acid leaching solutions. Typically these methods include pumping the oxidizing gas solution to the top of an ore heap and allowing the solution to percolate slowly through the heap. This process may be done under ambient conditions and requires no special equipment. A conventional leaching cycle using a suitable lixiviant is performed to recover the desired metal and the spent, water imiscible, oxidizing gas solution may be recycled and regenerated to fresh oxidizing gas solution by dissolving in the spent solution a replenishing supply of oxidizing gas.

Treatment of the ore may be made either prior to or during the leaching, or extraction, cycle. The oxidation treatment may therefore constitute a pretreatment cycle performed on the ore prior to the first leaching cycle or may be staged in relation to the leaching cycle to form one or more alternating oxidation treatment and leaching cycles.

The leaching process may require comminution of the ore particles prior to oxidation treatment. Comminution of metal-bearing ores is primarily required to liberate precious and base metals and such metal-bearing minerals to make them more amenable to extraction. The degree of comminution that may be required depends upon many factors, including the liberation size of the metal, the size and nature of the host minerals, and the method or methods to be applied for the metal recovery. The optimum particle size distribution is dictated by economic considerations; a balance between the amount of gold to be recovered, the processing costs, and the costs of comminution. For an overview of these considerations see, e.g., J. Marsden & I. House, "Chemistry of Gold Extraction," pp. 35, 105-06, Ellis Horwood Ltd., 1992 ISBN 0-13-131517-X.

The degree of ore crushing required for comminution to achieve good permeability, uniform distribution of the lixiviant solution, and satisfactory gold extraction has a paramount effect on the economics of the projected heap leaching operation. Either an excessive proportion of clays in the ore or an excessive amount of fines generated by crushing can slow the percolation rate of the leach solution causing an unproductive lixiviant contact with mineral in the heap. Agglomeration of the crushed ore is frequently required to overcome these difficulties and to achieve a permeable and uniform feed throughout the ore heap. Crushing circuits and agglomeration systems may sometimes be employed where their capital costs are justified by the economics of the overall process. Typical gold and silver heap leaching operations may incorporate multiple crushing stages, where justified, to make the ore most amenable to heap leaching and subsequent dissolution and recovery of metal values.

The oxidizing gases useful to make the oxidizing gas solutions of the present invention include any gas capable of oxidizing metal or metal ore that is also readily soluble in a perfluorinated fluid. Such gases include, for example, chlorine, ozone, chlorine dioxide, and sulfur dioxide.

The fluorinated fluids useful in this invention are compounds containing a high level of carbon-bound fluorine that are liquid at the operating conditions of the leaching process, i.e., have a boiling point near or above room temperature and have a freezing point below room temperature. These fluorinated fluids must be capable of dissolving a substantial amount of an oxidizing gas at operating conditions, typically in a temperature range from about 0° C. to about 50° C. Preferred fluids will dissolve at least 500 mL of gaseous chlorine per 100 mL of fluid at 1 atm. and 25° C. The most preferred fluorinated fluids will dissolve at least 1200 mL of gaseous chlorine at 1 atm. and 25° C. Preferably, the oxidizing gas solutions used in accordance with the methods of this invention will be saturated with the chosen oxidizing gas. Fluorinert™ Fluids, product bulletin 98-0211-8301-1(65.05)R, issued 5/95, available from 3M Co., St. Paul, Minn., provides the solubility of these oxidizing gases in Fluorinert™ Electronic Fluids.

Specific useful fluorinated fluids include perfluoroaliphatic and perfluorocycloaliphatic compounds having from 4 to about 18 carbon atoms, preferably from 4 to 10 carbon atoms, that may optionally contain one or more caternary heteroatoms, such as divalent oxygen or trivalent nitrogen atoms. The term "perfluorinated fluid" as used herein includes organic compounds in which all (or essentially all) of the hydrogen atoms are replaced with fluorine atoms. Representative perfluorinated liquids include cyclic and non-cyclic perfluoroalkanes, cyclic and non-cyclic perfluoroamines, cyclic and non-cyclic perfluoroethers, cyclic and non-cyclic perfluoroaminoethers, and any mixtures thereof. Specific representative perfluorinated liquids include the following: perfluoropentane, perfluorohexane, perfluoroheptane, perfluorooctane, perfluoromethylcyclohexane, perfluorotributyl amine, perfluorotriamyl amine, perfluoro-N-methylmorpholine, perfluoro-N-ethylmorpholine, perfluoroisopropyl morpholine, perfluoro-N-methyl pyrrolidine, perfluoro-1,2-bis(trifluoromethyl)hexafluorocyclobutane, perfluoro-2-butyltetrahydrofuran, perfluorotriethylamine, perfluorodibutyl ether, and mixtures of these and other perfluorinated liquids. Commercially available perfluorinated liquids that can be used in this invention include: Fluorinert™ FC™-43 Electronic Fluid, Fluorinert™ FC™-72 Electronic Fluid, Fluorinert™ FC™-77 Electronic Fluid, Fluorinert™ FC™-84 Electronic Fluid, Fluorinert™ FC™-87 Electronic Fluid, Performance Fluid™ PF-5060, Performance Fluid™ PF-5070, and Performance Fluid™ PF-5052. Some of these liquids are described in Fluorinert™ Electronic Fluids, product bulletin 98-0211-6086(212)NPI, issued 2/91, available from 3M Co., St. Paul, Minn. Other commercially available perfluorinated liquids that are considered useful in the present invention include perfluorinated liquids sold as Galden™ LS fluids and Flutec™ PP fluids.

The oxidizing gas solutions of the present invention may also be used to rapidly oxidize residual cyanide in barren cyanide lixiviant to a sufficiently low concentration to facilitate release of the barren lixiviant to the environment. These oxidizing gas solutions may comprise any of the aforementioned gases dissolved in a perfluorinated liquid or may comprise a solution of oxygen dissolved in a fluorinated liquid. The destruction of cyanide with a chlorine oxidizing gas solution proceds by the following reaction mechanism:

(I) $CN^- + Cl_2 \lessdot \ldots > CNCl_{(g)} + Cl^-$ 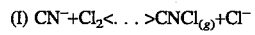

(II) $CNCl_{(g)} + 2OH^- \lessdot \ldots > CNO^- + Cl^- + H_2O$ 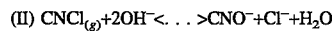

(II) $2CNO^- + 3ClO^- + H_2O \lessdot \ldots > N_2 + 2CO_2 + 3Cl^- + 2OH^-$ 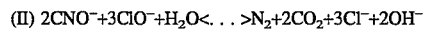

Residual cyanide in a waste lixiviant stream may be reduced or eliminated by contacting the barren lixiviant stream with fresh oxidizing gas solution, e.g. comprising chlorine gas dissolved in a fluorinated liquid that proceeds according to the above mechanism or comprising oxygen gas dissolved in a fluorinated fluid proceeding by an analogous mechanism. The oxidizing gas solution may also be used to rinse leached ore thereby reducing the amount of residual cyanide remaining in the contacted ore. These techniques may be used to reduce concentration of cyanide in the barren lixiviant stream to levels below 0.20 parts per million.

EXAMPLES

The following examples are offered to aid in a better understanding of the present invention. These examples are not to be construed as an exhaustive compilation of all embodiments of the present invention and are not to be unnecessarily construed as limiting the scope thereof.

Comparative Example C1

For comparative purposes, a column study was run for a period of 79 days to develop a baseline for extraction of gold and silver from low-grade ore leached with an aqueous alkaline cyanide lixiviant. For Comparative Example 1, approximately 3000 lb (1360 kg) leach-feed material was obtained from Coeur Rochester, Inc., a heap leaching operation in Nevada. The ore was mixed without further crushing, then was sifted through four different mesh size screens: ½ inch (1.3 cm), ⅜ inch (1.0 cm), ¼ inch (0.6 cm) and 10 mesh using a Gilson Test Master screen apparatus. The screen analysis for each size fraction for the column test feed was then calculated based on the relative weight % of each size fraction from the test feed screen analysis. An 200 lb (90 kg) test charge was reconstituted by weight and size distribution and was placed in a 55 gallon (200 L) steel drum. A composite sample was also produced for head assay and individual screen fraction analysis of gold and silver by fire assay and atomic absorption methods.

A surfactant solution, containing a surfactant of the structure $C_5F_{11}O(CF_2)_5COO^- H_4N^+$, was also prepared for addition to the ore. The fluoroaliphatic surfactant was prepared as follows: 118.2 g (1.0 mol) of hexane-1,6-diol, 4.4. g of Adogen™ 464 quaternary ammonium salt (available from Witco Corp.), 80.0 g (2.0 mol) of NaOH and 250 mL of tetrahydrofuran was stirred at reflux. To this mixture was added 80 mL of deionized water to facilitate mixing. After approximately 20 minutes, 151 g (1.0 mol) of n-pentyl bromide was added over 30 minutes and the contents were stirred overnight at reflux. The reaction mixture was stripped using a rotary evaporator. To the resulting stripped layer was added 100 mL of $CHCl_3$. 150 mL of acetyl chloride was then added dropwise and the mixture subsequently heated at reflux for 4 hours. Solvent was stripped to yield the crude product. The crude product, comprising $C_5H_{11}O(CH_2)_6OC(O)CH_3$, was distilled at 125° C. (3 torr) and the distillate was fluorinated by direct fluorination as described, for example, by U.S. Pat. No. 4,894,484 (Lagow et al.). The fluorinated ester was treated with a 23 wt % aqueous sodium hydroxide solution and acidified with 50 wt % aqueous $H_2SO_4$. The addition of 3M Fluorinert™ FC™-75 Electronic Fluid, a perfluorinated fluid available from 3M and consisting primarily of a blend of perfluoro(2-butyltetrahydrofuran) and perfluorooctane, and mixing yielded a clear, 2-phase system. The lower phase was stripped and distilled to an essentially pure acid product, $C_5F_{11}O(CF_2)_5CO_2H$, boiling at 90°–110° C. at 0.4 torr. The fluorinated carboxylic acid was treated with an excess of dilute aqueous ammonia to form the ammonium salt that was freeze-dried to a solid and was dissolved in water to form a 5 wt % solids stock solution. The stock surfactant solution was then diluted with water to give 10 liters of a 250 ppm surfactant solution.

The previously described ore-containing drum was placed on a tilted roller mixer, 90 g of calcium oxide (lime) was added to each drum, and 4 L of the surfactant solution was added to the drum slowly during mixing to achieve uniform solution distribution. The drum was tumbled for about 5 minutes, then the agglomerated ore was unloaded into a 6 ft. (1.8 m) high by 8 in. (20 cm) diameter column with sides constructed from a section of polyvinyl chloride (PVC) piping and bottom constructed from a circular sheet of PVC with a hole, with a piece of 1-inch PVC tubing inserted snugly through the bottom hole from the outside and connected at the other end through a hole in the lid of a covered 1-gallon narrow mouth plastic jug.

The lixiviant was prepared by charging the following ingredients in a 55 gal (200 L) drum. First, approximately 120 L of water was added to the drum, followed by 120 g of calcium oxide (1 g CaO/L $H_2O$). The solutions was allowed to mix for 3 hours, then the exact amount of water charged to each drum was calculated by titrating for hydroxide ion produced by the reaction of the calcium oxide with the water. Then sodium cyanide was added at 0.5 g NaCN/L $H_2O$, the surfactant stock solution was added to give the desired ppm level, and the resulting solution was mixed again for about 2 hours at ambient conditions (about 95° F. or 35° C.). The final pH of the lixiviant was in the 10–11.5 range.

For each day of the leaching study, fresh lixiviant was used from each drum. The concentrations of each ingredient in the lixiviant was determined prior to each day's leaching due to possible degradation under the aerobic high pH conditions. The lixiviant was titrated for cyanide and lime and the appropriate amount for replenishment was calculated and added.

Figure 2:
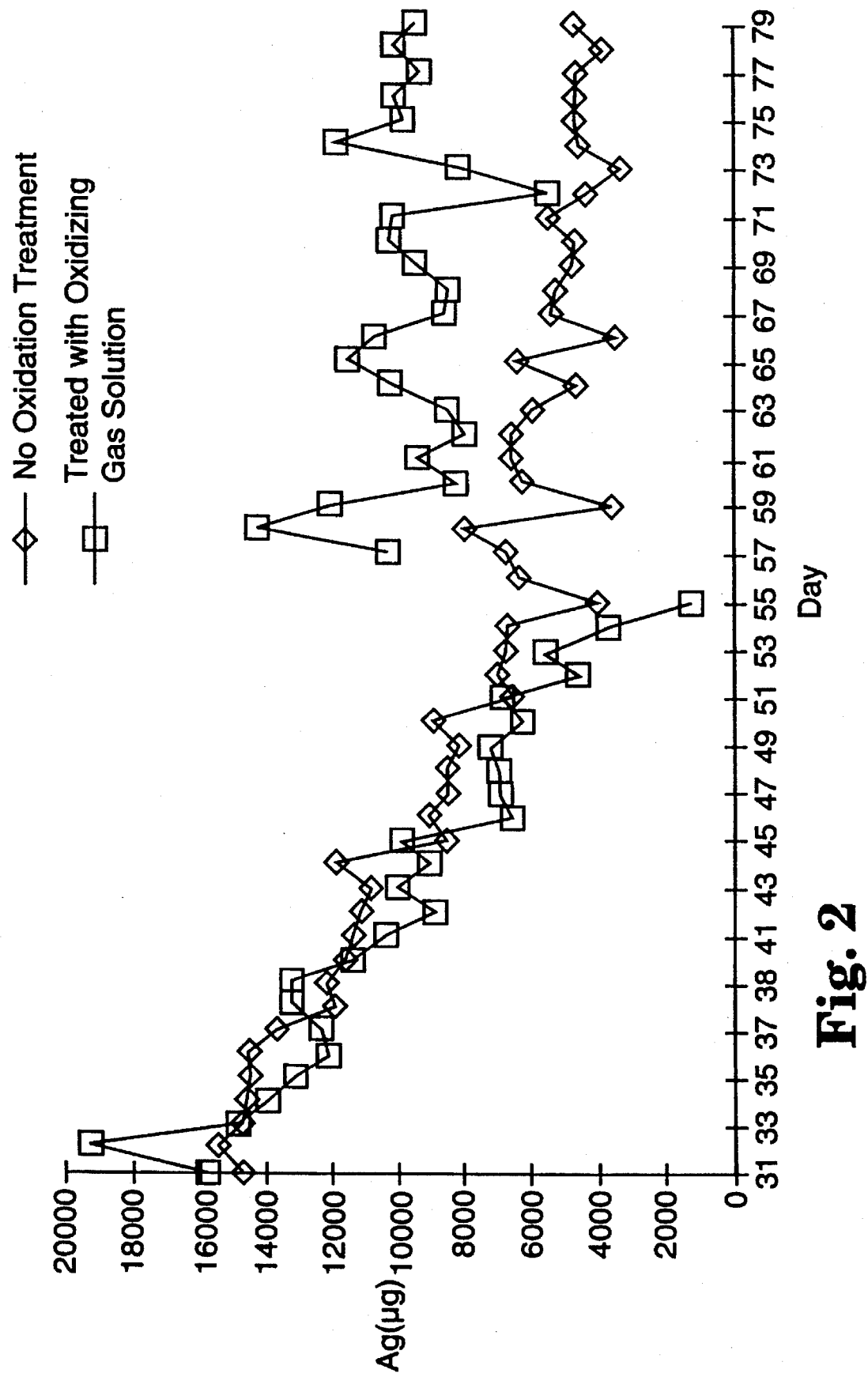
FIG. 2 is a plot of daily silver extractions recovered from the same two column assays of a precious metal-bearing ore as presented by FIG. 1, comparing the relative recoveries obtained with and without oxidative treatment in accordance with this invention.

As a daily procedure for the leaching test, the lixiviant was applied to the top of the ore column at a rate of 0.005 gal/min/ft$^2$ (210 mL/min/m$^2$) for each of the first 15 days, followed by 0.001 gal/min/ft$^2$ (42 mL/min/m$^2$) for each of the final 66 days. Solutions were collected daily from the bottom of the column and were submitted for gold and silver analysis using conventional atomic absorption methods. Gold and silver concentrations were reported in parts per million (ppm). The total amount of gold and silver present in each daily pregnant leach solution (µg) was calculated by multiplying the volume of pregnant leachate (L) times the metal concentration (ppm). FIG. 1 graphically presents the results of this study for the recovery of gold in direct comparison to Example 1, wherein the column was subjected to an oxidation treatment using an oxidizing gas solution of this invention during the leach cycle. FIG. 2 presents analogous results for the recovery of silver.

Example 1

For Example 1, a column study using an aqueous alkaline lixiviant to leach gold and silver from ore was run in the same manner as Comparative Example C1 except that the flow of lixiviant was interrupted during days 53 and 54 of the test to treat the column with an oxidizing gas solution according to the method described by this invention.

The oxidizing gas solution was prepared by sparging chlorine into 4 liters of Fluorinert™ F™-75 Electronic Fluid until the fluid was saturated with chlorine gas (i.e., when the solution no longer turned darker yellow-green and chlorine gas remained on the surface of the solution). The oxidizing gas solution was then introduced into the top of the column, allowing the solution to contact and percolate through the ore particles in the column and exit through the bottom of the column, in the same way that the pregnant leaching solution exits. The oxidizing gas solution was added over a period of 2 days (i.e., during days 53 and 54 of the leaching test), at a rate of 0.001 gal/min/ft$^2$ (42 mL/min/m$^2$) for a total volume of 1.5 L added each day.

The oxidizing solution entering the column was yellow in color, due to the presence of chlorine. The oxidizing solution exiting the column was water-white, indicating the absence of chlorine (i.e., essentially all of the chlorine had reacted with the ore in the column). The liquid drainage of both the alkaline cyanide lixiviant and the oxidizing gas solution were collected from the bottom of the column and their respective volumes were determined by using a separatory funnel and a graduated cylinder.

Following the two days of oxidizing gas solution treatment, leaching with alkaline cyanide lixiviant was resumed at day 55 and continued until the end of testing at day 79. FIG. 1 graphically present the results of this study for the recovery of gold in direct comparison to Example 1, wherein the column was not subjected to an oxidation treatment. FIG. 2 presents analogous results for the recovery of silver.

The data of FIGS. 1 & 2 show that, in comparison to the baseline leaching results from this ore with no oxidation treatment, daily recoveries of gold and silver in the pregnant leach solution rose immediately and remained elevated on days 55–79 after the ore in the column was treated with the oxidizing gas solution on days 53–54 of the trial.

Table 1 presents the average daily precious metal recoveries of Example 1 before and after the ore was treated with oxidizing gas solution (i.e., day 31 through day 52 and day 57 through day 79 respectively). Data presented in parentheses correspond to the average daily precious metal recoveries of Comparative Example C1 where the ore was not treated with oxidizing gas solution.

TABLE 1

| Metal | Days | Avg. Recovery (µg) |
|---|---|---|
| Gold | 31–52 | 59.9 (60.0) |
| Gold | 57–79 | 66.8 (21.3) |
| Silver | 31–52 | 10,660 (11,377) |
| Silver | 57–79 | 9970 (5387) |

The data of Table 1 show that average daily gold recovery increased after the ore was treated with oxidizing gas solution, while averaged daily silver recovery was only slightly less than before column treatment. In contrast, the ore that was not treated with oxidizing gas solution showed much lower daily recovery of both gold and silver from day 57 through day 79 compared to during day 31 through day 52.

Example 2

In Example 2, an experiment was run to demonstrate the use of an oxidizing gas solution to destroy by oxidation residual cyanide left on the leach test column. Using the same procedure as described in Comparative Example C1, a column containing ore particles was leached with aqueous cyanide lixiviant for 81 days. By titration, the concentration of cyanide in the pregnant solution was measured, at day 81, to be approximately 0.5 g/L (500 ppm). For the next 48 hours (leach days 82 and 83), the ore column was rinsed with a saturated solution of chlorine in Fluorinert™ FC™-75 Electronic Fluid at a rate of 0.001 gal/min/ft$^2$ (42 mL/min/m$^2$). After the rinsing with oxidizing gas solution, the column was rinsed daily with water at 0.001 gal/min/ft$^2$ (42 mL/min/m$^2$) and the rinse solution was titrated daily for cyanide concentration, with the objective to reduce cyanide concentration in the rinse to less than 0.20 parts per million. The aqueous rinse exiting this column contained below the target concentration of 0.20 ppm cyanide on leach day 107.

Comparative Example C2

In Comparative Example C2, the same experiment was run as in Example 2 except that instead of rinsing the column for 48 hours during leach days 82 and 83 with oxidizing gas solution, the column was rinsed with water. In other words, only water was used during the whole rinsing test. The aqueous rinse exiting this column contained below the target concentration of 0.20 ppm cyanide on leach day 114, a full week later than when oxidizing gas solution was used prior to the water rinse.

Example 3

In Example 3, an ore column was oxidized twice during the leaching cycle with an oxidizing solution consisting of a saturated solution of chlorine in Fluorinert™ FC™-77 Electronic Fluid (a perfluorinated fluid available from 3M and consisting primarily of a blend of perfluoro(2-butyltetrahydrofuran) and perfluorooctane) and the effect on daily gold and silver recovery was measured.

The ore used for this experiment was a gold-silver spent ore procured from the Coeur Rochester Mine near Lovelock, Nevada, that previously had been leached with cyanide lixiviant for a period of about 2 years having approximately 50% of its Ag and approximately 5% of its Au remaining. The entire sample of spent ore was screened on four different mesh size screens: ½ inch (1.3 cm), ⅜ inch (1.0 cm), ¼ inch (0.6 cm) and 10 mesh using a Gilson Test Master screen apparatus. Test charges weighing 270 kg were reconstituted based on the particle size distribution of the whole sample. A representative portion of each individual screen fraction was riffle-split, was pulverized, and was submitted for gold and silver analysis by fire assay. A composite ore sample was prepared from the pulverized material and was submitted for gold and silver analysis by fire assay.

A 270 kg ore test charge was placed in a drum agglomeration apparatus as described for Comparative Example C1 and was agglomerated with Tucson City tap water. The agglomerated test charge was loaded into a 6.1 m tall by 20 cm diameter polyvinyl chloride column with a drainage tube inserted snugly through its bottom and was leached at an irrigation rate of 0.0025 gal/min/ft$^2$ (105 mL/min/m$^2$) with an aqueous leach feed solution containing 2.0 lb sodium cyanide per ton of solution (0.10 % by weight) and sufficient calcium oxide to maintain the pH of the solution in the range of 10.5 to 11.5.

After 6 days of leaching, a saturated-lime aqueous leach feed solution containing 2.0 lb sodium cyanide per ton of solution (0.10 % by weight) and having a pH above 12.0 was introduced into the column to raise the pH of the aqueous pregnant solution, which had drifted to below 10. This lime-saturated aqueous leach feed solution was continued for the next 36 days (i.e., days 7–42) until the pH of the pregnant solution was above 10.0. Pregnant solutions were also analyzed for gold and silver using atomic absorption.

On day 42, 4.5 L of an oxidizing gas solution of Fluorinert™ FC™-77 Electronic Fluid saturated with chlorine was introduced into the ore column in place of the leaching solution and at the same flow rate. The process with the oxidizing gas solution was repeated on day 43, resulting in a total of 9.0 L of oxidizing gas solution added over the two-day period. The volumes of cyanide pregnant solution and spent oxidizing gas solution were determined for the leach days following chlorination by use of a separatory funnel and a graduated cylinder.

For the next 27 days (day 44 through day 70), the column was irrigated with normal cyanide leach feed solution until day 70, then for the next 4 days with lime-saturated aqueous leach feed solution (day 70 through day 74) to bring up the pH of the cyanide pregnant solution.

On day 74, leaching was discontinued and the column was allowed to drain for 48 hours. On days 76 and 77, the procedure was repeated as was done on days 42 and 43, i.e. contacting the ore in the column with oxidizing gas solution.

After the second ore oxidation, the column was allowed a 72-hour rest period (day 78 through day 80), then cyanide leaching was resumed on day 81 with normal cyanide leach feed solution. After six days, the column was irrigated with lime-saturated feed solution in order to increase the pH of the daily pregnant solutions. On day 93, the irrigation rate was increased to 0.005 gal/min/ft$^2$ (210 mL/min/m$^2$) and this was continued through day 111. The leach flow rate was reduced back to 0.0025 gal/min/ft$^2$ (105 mL/min/m$^2$) on day 112. On day 113 the column was rinsed with water for 48 hours and was allowed to drain for an additional 48 hours.

Simultaneous to this experiment, a second analogous experiment was run with a control ore column where no ore oxidation was done. Instead of the first ore oxidation, the control column was maintained under cyanide leach during days 42 and 43. Instead of the second ore oxidation, the column was treated with Fluorinert™ FC™-77 alone (i.e., containing no chlorine) during days 76 and 77, at the same flow rate and total volume as with the oxidizing gas solution.

The gold and silver contents (in µg) of the pregnant solutions was determined daily from the pregnant solution volume and metal assays (atomic absorption) for the chlorine-oxidized and control ore columns during 4 different time periods: three weeks prior to the first ore oxidation (day 22 through day 42), three weeks following the first ore oxidation (day 44 through day 64), three weeks prior to the second ore oxidation (day 56 through day 76), and three weeks following the second ore oxidation (day 81 through day 101).

For the three weeks prior to the first ore oxidation, the pregnant solution from the chlorine-oxidized ore column averaged 783 µg per day lower in silver content and no difference in gold content compared to the pregnant solution from the control ore column. For the three weeks following the first ore oxidation, the pregnant solution from the chlorine-oxidized ore column averaged 474 µg and 3 µg per day higher in silver and gold content respectively, compared to the pregnant solution from the control ore column. Thus, the pregnant solution from the chlorine-oxidized ore column showed a net average daily gain of 1267 µg and 3 µg per day of silver and gold respectively after the first oxidation compared to the pregnant solution from the control ore column.

For the three weeks prior to the second ore oxidation, the pregnant solution from the chlorine-oxidized ore column averaged 358 µg per day higher in silver content and no difference in gold content compared to the pregnant solution from the control ore column. For the three weeks following the second ore oxidation, the pregnant solution from the chlorine-oxidized ore column averaged 579 µg per day higher in silver content and no difference in gold content compared to the pregnant solution from the control ore column. Thus, the pregnant solution from the chlorine-oxidized ore column showed a net average daily gain of 221 µg per day of silver and no difference in gold respectively after oxidation when compared to the pregnant solution from the control ore column. The pH of the pregnant solution dropped to below 8.0 after the second ore oxidation, resulting in low alkaline cyanide concentration, that may have masked the potential benefits of the treatment.

Example 4

In Example 4, a small scale laboratory study was run to show the utility of oxidizing low recovery copper sulfide ore with an oxidizing gas solution of this invention prior to extraction of copper metal values with aqueous sulfuric acid leach solution.

A sample of low recovery sulfide ore was obtained from the Phelps-Dodge Tyrone mine located near Silver City, N. Mex. The dominant copper mineralizations of the ore sample were chalcopyrite, covellite and chalcocite. The ore sample had a total copper content of 0.41% with a leach recoverable value of 43% of the total copper value. The ore sample was crushed to a nominal size so that 100% of the ore passed through a 1 inch screen. Using a series of 8-inch diameter mesh screens, the crushed ore sample was segregated into five discrete size fractions: −10 mesh, +10 mesh to −7 mesh, +7 mesh to −4 mesh, +4 mesh to −2 mesh, and +2 mesh to 1 inch. This separation by screen size allowed consistent surface area-to-ore charge weight ratio when reconstituting samples during the subsequent copper ore oxidation and leaching experiments.

A 600 g ore charge comprised of a mixture of 200 g of the +10 mesh to −7 mesh fraction, 200 g of the +7 mesh to −4 mesh fraction, and 200 g of the +4 mesh to −2 mesh fraction was placed into a 1 L Nalgene™ narrow-mouth polyethylene bottle. 600 g of an oxidizing gas solution consisting of chlorine-saturated Fluorinert™ FC™-77 Electronic Fluid was added to the ore-containing bottle and the bottle was tightly sealed with the cap. Initially, the chlorine-saturated perfluorocarbon had a distinctive greenish-yellow tint. The sealed container was placed on a roller mill and was allowed to roll for two hours at a rate of 4 rpm to allow gentle mixing and continuous contact of the ore with the oxidizing gas solution. During the oxidation process, the temperature of the oxidizing gas solution increased noticeably and after the two-hour treatment, the solution no longer had any visible color and had a slight chlorine odor. The container was then removed from the mill, the spent oxidizing gas solution was drained from the ore, and the ore was removed from the bottle and was allowed to dry overnight. The dried ore charge was then returned to the polyethylene bottle, 300 g of an aqueous leach solution containing 25 g/L of sulfuric acid was added, the bottle was tightly capped and was placed back on the roller mill at 4 rpm for a period of 72 hours. During this leach cycle, 5 mL aliquots of the aqueous leach solution were periodically removed to analyze for the level of soluble copper using atomic absorption spectroscopy. After each removal, a fresh 5 mL aliquot of aqueous sulfuric acid leach solution was added to the bottle to maintain the total solution volume at its original level.

The concentration of soluble copper in the aqueous sulfuric acid leach solution as a function of leaching time is presented in Table 2.

Comparative Example C3

In Comparative Example C3, the same experiment was run as in Example 4 except that the ore oxidation step was omitted and only the aqueous sulfuric acid leach step was done.

The concentration of soluble copper in the aqueous sulfuric acid leach solution as a function of leaching time is presented in Table 2.

TABLE 2

| | Concentration of Copper in Leachate (ppm) | |
|---|---|---|
| Time (hr) | Example 4 | Comparative Example C3 |
| 1.5 | 3409 | 2096 |
| 3 | 3508 | 2268 |
| 6 | 3535 | 2335 |
| 12 | 3575 | 2351 |
| 24 | 3592 | 2244 |
| 48 | 3620 | 2377 |
| 72 | 3280 | 2245 |

The data in Table 2 show that, at all times, the aqueous sulfuric acid leach solution contained over 50% more copper when the copper ore sample was oxidized with the oxidizing gas solution prior to acid leaching.

Example 5

600 g of the +4 mesh to −2 mesh copper ore fraction from Example 4 and 600 g of an oxidizing gas solution consisting of chlorine-saturated Fluorinert™ FC™-77 Electronic Fluid were placed in a 500 mL Nalgene™ polyethylene bottle. The charged bottle was placed on a roller mill at 4 rpm for two hours. Afterwards, the oxidizing gas solution was drained from the bottle and the oxidized ore was removed and was allowed to dry overnight. The ore was then returned to the original bottle, and leaching with aqueous sulfuric acid was done as described in Example 4, as was periodic determination for soluble copper concentration using atomic absorption spectroscopy and replenishment of aqueous sulfuric acid leach solution.

The concentration of soluble copper in the aqueous sulfuric acid leach solution as a function of leaching time is presented in Table 3.

Comparative Example C4

In Comparative Example C4, the same experiment was run as in Example 5 except 300 g of 5.25% (wt) aqueous sodium hypochlorite was used in place of 600 g of chlorine-saturated FC™-77 during the ore oxidation step.

The concentration of soluble copper in the aqueous sulfuric acid leach solution as a function of leaching time is presented in Table 3.

Comparative Example C5

In Comparative Example C5, the same experiment was run as in Example 5 except that the ore oxidation step was omitted and only the aqueous sulfuric acid leach step was done.

The concentration of soluble copper in the aqueous sulfuric acid leach solution as a function of leaching time is presented in Table 3.

TABLE 3

| Time | Concentration of Copper in Leachate (ppm) | | |
|---|---|---|---|
| (hr) | Example 5 | Comp. Example C4 | Comp. Example C5 |
| 6 | 2068 | 3 | 1265 |
| 12 | 2157 | 1228 | 1471 |
| 24 | 2011 | 1370 | 1691 |
| 48 | 2320 | 1538 | 1951 |
| 72 | 2271 | 1712 | 2103 |

The data in Table 3 show that the oxidizing gas solution clearly outperforms the aqueous sodium hypochlorite solution as an oxidizing agent for copper ore prior to extraction of the ore with aqueous sulfuric acid leaching solution. In fact, the aqueous sodium hypochlorite solution produced slightly lower soluble copper in the sulfuric acid leaching solution than when no ore oxidation treatment was employed.

We claim:

1. A method of leaching precious and base metal values from metal bearing ore and ore concentrates comprising the steps of:

treating a metal bearing ore or ore concentrate by contacting said metal-bearing ore or ore concentrate with an oxidizing gas solution comprising a solution of an oxidizing gas dissolved in a perfluorinated liquid; and extracting the precious or base metal values from the treated metal-bearing ore or ore concentrate.

2. The method of claim 1 wherein the oxidizing gas is selected from the group consisting of chlorine, ozone, chlorine dioxide, and sulfur dioxide.

3. The method of claim 1 wherein the perfluorinated liquid is selected from the group consisting of cyclic and non-cyclic perfluoroalkanes, cyclic and non-cyclic perfluoroamines, cyclic and non-cyclic perfluoroethers, and cyclic and non-cyclic perfluoroaminoethers.

4. The method of claim 1 wherein the perfluorinated liquid has a boiling point near or above room temperature and has a freezing point below room temperature.

5. The method of claim 1 wherein the oxidizing gas solution is saturated.

6. The method of claim 1 wherein the contacting step is performed prior to the extraction step.

7. The method of claim 1 wherein the contacting step is performed during the extraction step.

8. The method of claim 1 wherein the contacting step and the extraction step are performed intermittently to form a staged leaching process comprising alternating contacting and extraction stages.

9. The method of claim 1 further comprising concentrating the ore by agglomeration or comminution prior to contacting with the oxidizing gas solution.

10. The method of claim 1 wherein the leaching is performed by heap, vat, or agitation leach mining.

11. The method of claim 1 wherein the precious metal value to be recovered is gold and wherein the extraction comprises contacting the ore with an aqueous solution comprising alkaline cyanide.

12. The method of claim 11 further comprising the step of recovering elemental gold by adsorption on activated carbon.

13. The method of claim 1 wherein the precious metal value to be recovered is silver and wherein the extraction comprises contacting the ore with an aqueous solution comprising alkaline cyanide.

14. The method of claim 13 further comprising the step of recovering elemental silver and elemental gold by precipitation with zinc metal.

15. The method of claim 1 wherein the base metal value to be recovered is copper and wherein the extraction comprises contacting the ore with an aqueous solution comprising sulfuric acid.

* * * * *